(12) United States Patent
Berland

(10) Patent No.: US 8,220,751 B1
(45) Date of Patent: Jul. 17, 2012

(54) MULTI-GROMMET RETAINED SLIDER FOR PARACHUTES

(75) Inventor: Jean C. Berland, Wynnewood, PA (US)

(73) Assignee: Airborne Systems North America of NJ, Inc., Pennsauken, NJ (US)

( * ) Notice: Subject to any disclaimer, the term of this patent is extended or adjusted under 35 U.S.C. 154(b) by 0 days.

(21) Appl. No.: 13/344,138

(22) Filed: Jan. 5, 2012

Related U.S. Application Data

(63) Continuation of application No. 12/073,206, filed on Mar. 3, 2008, now Pat. No. 8,091,834, which is a continuation-in-part of application No. 11/201,186, filed on Aug. 11, 2005, now Pat. No. 7,338,016.

(51) Int. Cl.
   *B64D 17/00* (2006.01)
(52) U.S. Cl. .......... 244/146; 244/142; 244/147
(58) Field of Classification Search ............ 244/146, 244/152, 138 R, 142, 147; 446/49
   See application file for complete search history.

(56) References Cited

U.S. PATENT DOCUMENTS

| | | | | |
|---|---|---|---|---|
| 4,540,145 A * | 9/1985 | Matsuo | | 244/152 |
| 4,678,145 A * | 7/1987 | Buehrer et al. | | 244/152 |
| 4,863,119 A * | 9/1989 | Case et al. | | 244/152 |
| 4,955,564 A * | 9/1990 | Reuter | | 244/149 |
| 5,005,785 A * | 4/1991 | Puskas | | 244/152 |
| 6,270,128 B1 * | 8/2001 | Coe | | 289/1.5 |
| 6,276,638 B1 * | 8/2001 | Parker et al. | | 244/142 |
| 6,520,453 B1 * | 2/2003 | Sadeck | | 244/145 |
| 6,843,451 B1 * | 1/2005 | Fox, Jr. | | 244/152 |
| 7,028,951 B1 * | 4/2006 | Sadeck | | 244/152 |
| 2001/0050323 A1 * | 12/2001 | Brownell | | 244/142 |
| 2003/0038215 A1 * | 2/2003 | Benney et al. | | 244/145 |
| 2006/0231684 A1 * | 10/2006 | Sadeck | | 244/149 |

* cited by examiner

*Primary Examiner* — Tien Dinh
*Assistant Examiner* — Philip J Bonzell
(74) *Attorney, Agent, or Firm* — Jacobson Holman PLLC

(57) ABSTRACT

A reefing slider for providing improved line management and canopy deployment characteristics of a ram air inflated airfoil type canopy. During initial descent of the parachute the slider, secured by retaining elements, is held against the canopy in the upper reefing position where it mechanically restricts canopy deployment while giving the canopy time to achieve proper orientation following the drop from the launching aircraft. Upon sufficient air flow into the canopy cells, the retaining elements separate, releasing the slider and enabling full opening of the canopy.

22 Claims, 6 Drawing Sheets

FIG. 1
FIG. 6
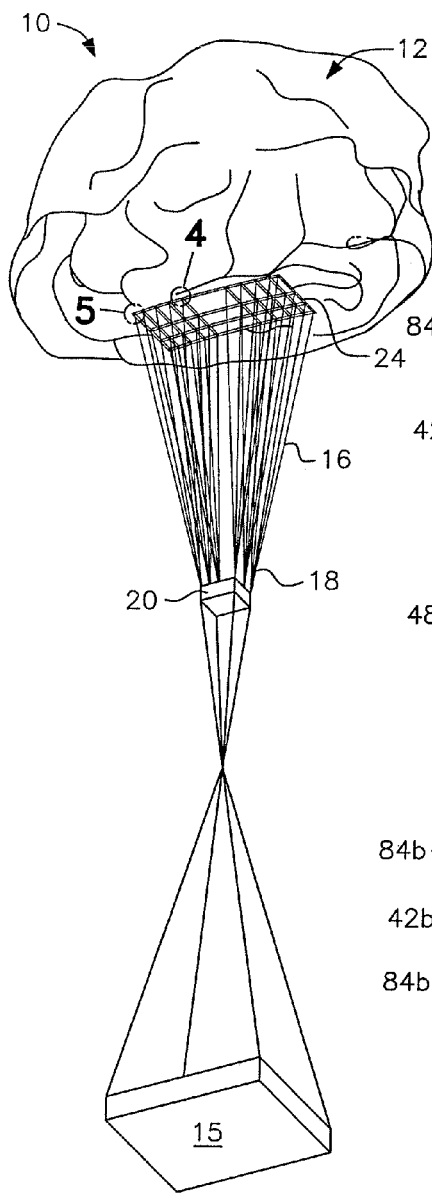
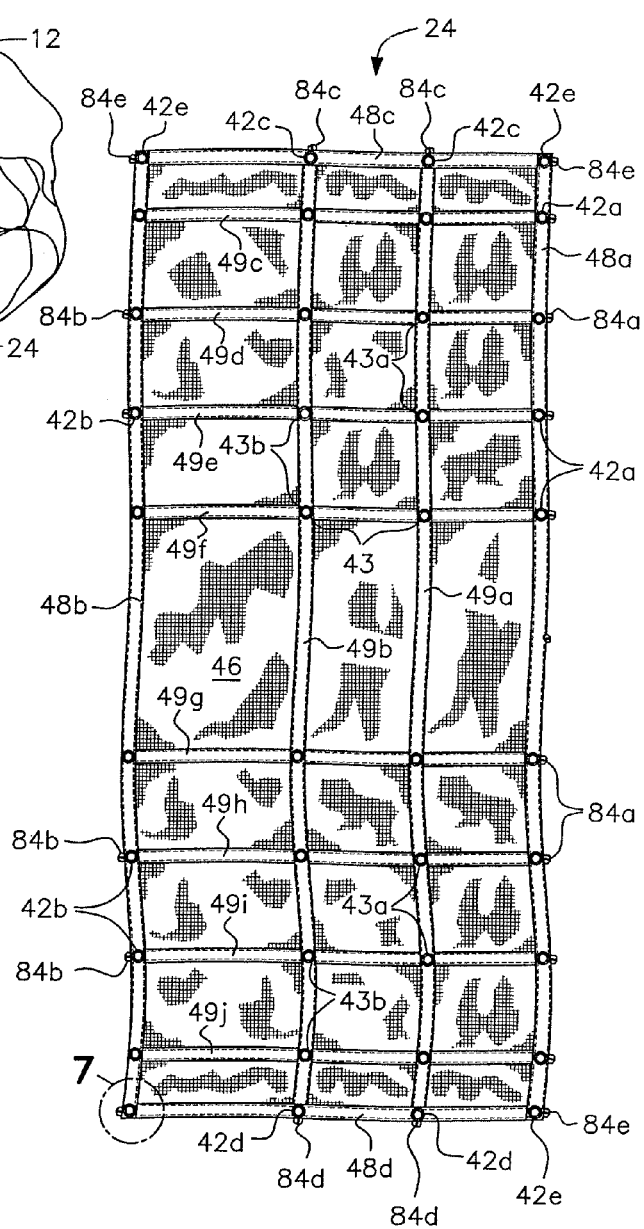

MULTI-GROMMET RETAINED SLIDER FOR PARACHUTES

RELATED APPLICATIONS

This application is a continuation of application Ser. No. 12/073,206, filed Mar. 3, 2008, issuing as U.S. Pat. No. 8,091,834 on Jan. 10, 2012, which was a continuation-in-part of application Ser. No. 11/201,186, filed Aug. 11, 2005, which issued as U.S. Pat. No. 7,338,016 on Mar. 4, 2008, and hereby claims the priority thereof to which it is entitled.

BACKGROUND OF THE INVENTION

1. Field of the Invention

The present invention relates in general to delaying the opening of parachute canopies and, more particularly, to a slider type reefing device that is secured to the canopy during initial parachute deployment.

2. Description of the Related Art

A known problem with the use of parachutes to lower personnel and unmanned cargo to the ground from airplanes and other airborne craft is the sudden shock when the parachute opens and fills quickly with air. This is especially serious at high speeds where the canopy fills more rapidly, as may occur during the deployment of parafoils designed to fly at high wing loadings.

The mechanical reefing of parachute canopies by sliders on the canopy suspension lines for the purpose of delaying canopy opening and/or reducing canopy opening shock is already well known as representatively disclosed in U.S. Pat. No. 5,005,785 to Puskas. According to such prior art arrangement, opening of a ram-air inflated, airfoil gliding parachute canopy (hereinafter "ram air parachutes" or "ram air canopies") is physically restricted to a decreasing extent as the reefing slider is displaced downwardly from an upper reefing position along converging suspension lines under canopy opening forces.

The reefing system disclosed in the Puskas patent achieves aerodynamic delay by means of a flow deflecting flap extending from the slider beyond the suspension lines so as to be positioned in alignment with the leading edge portion of the canopy in the upper reefing position. However, because the slider is not physically connected to the canopy, heavier payloads can render the flap insufficient to withstand the force of the air flowing into the canopy upon deployment. Hence, under heavy loading of the parachute canopy, the slider may descend too rapidly such that adequate retarding of the canopy opening process is not achieved.

One system has been developed by Pioneer Aerospace Corporation that is directed to a large forward-gliding parachute canopy bearing a heavy payload such as spacecraft returning from orbit. This system relies upon pyrotechnic connections between adjacent chords of the canopy which are activated to release one section of the canopy at a time. However, the system is highly complex and very expensive, making it unsuitable for routine and repeated airborne delivery of equipment and supplies such as is needed for troop support during military operations, particularly during periods of war and foreign occupation.

Therefore, a need exists for a reefing device suitable for large and very large ram air canopies that produces a retarded rate of slider descent while also providing suspension line management capabilities. A need also exists for a reefing device that is released based upon actual forces imposed on the canopy, making it more responsive to dynamic deployment or opening conditions and appropriate for use with heavy payloads being delivered by forward gliding parachute canopies of the ram-air inflated airfoil type.

SUMMARY OF THE INVENTION

In view of the foregoing, and the need to overcome the difficulties of undesirable inflation characteristics in ram air parachutes supporting large payloads, the present invention is directed to a generally rectangular slider type reefing device that is physically secured to the ram air canopy to retard its initial descent along the suspension lines. Retention of the slider prolongs the physical restriction of the ram air canopy opening process, producing delay in the inflation of the canopy by reducing the inflow of inflating air to the cells of the canopy.

The generally rectangular slider is provided with multiple, appropriately spaced grommets for managed segregation of the suspension lines, and is retained against the canopy by retaining devices positioned adjacent to at least the edge grommets. The retaining devices include slider retaining loops secured adjacent to at least the slider edge grommets, canopy retaining loops secured to the canopy, and breakable fastening elements to secure the slider retaining loops and the canopy retaining loops together in respective pairs. To compensate for varying load on different portions of the canopy, the strength of the breakable fastening elements can vary at each grommet location according to distance from the wing tip so as to preferably obtain a uniformly timed release of the fastening elements and the subsequent even release of the slider retaining loops from their corresponding canopy retaining loops.

It is therefore an object of the present invention to provide a retained slider system in which the slider is secured to at least the leading edge portion of the ram air canopy with breakaway fastening elements that delay initial descent of the slider from the upper reefing position.

Another object of the present invention is to provide a relatively simple, force-activated system for securing and then releasing the edges of a forward gliding parachute canopy of the ram-air inflated airfoil type to regulate the opening thereof.

A further object of the present invention is to provide a slider system with retaining devices having variable retention strength which is both reliable and effective for modulating the canopy inflation and opening process during chute deployment.

A still further object of the present invention is to provide a retained slider system that can be readily adapted to fit and work effectively with a wide range of commercially available ram air parachutes while requiring minimal adaptation of the existing parachute structure.

It is yet another object of the invention to provide a slider type reefing device that is not complex in structure and which will conform to conventional forms of manufacture so as to provide a canopy inflation control system that is economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a ram-air inflated airfoil-type parachute with the retained slider reefing system of the present invention installed thereon, shown with the slider in the upper reefing position prior to release from the canopy.

FIG. 6 is a plan view of the slider of FIGS. 1 and 2.

DETAILED DESCRIPTION OF THE PREFERRED EMBODIMENTS

Figure 2:
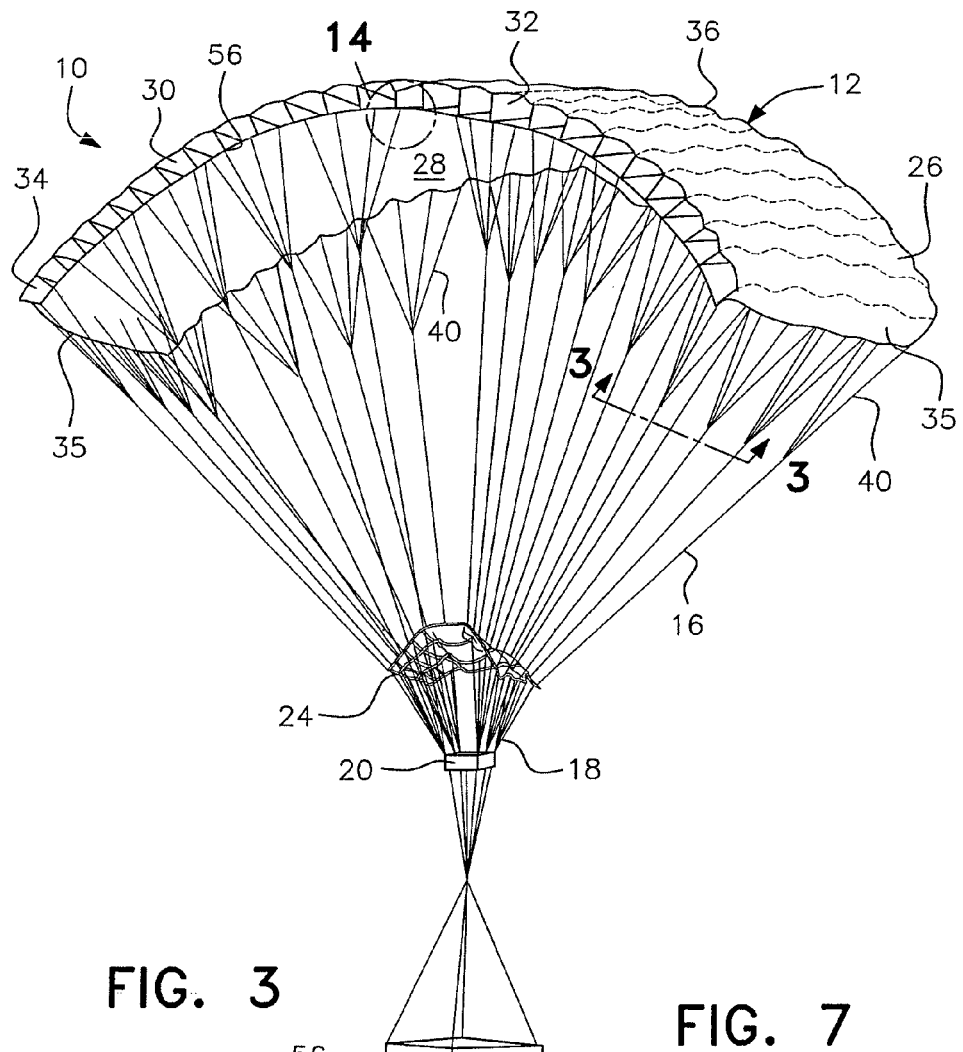
FIG. 2 is a perspective view of the ram air parachute of FIG. 1, shown as fully deployed, with the slider in a lower position.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 3:
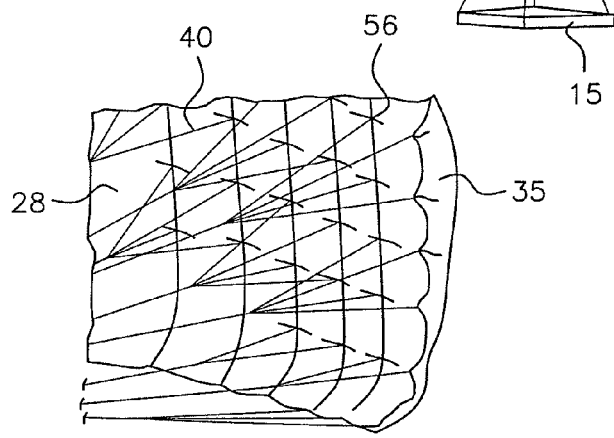
FIG. 3 is a more detailed view of a portion of the bottom surface of the parachute taken along line 3-3 of FIG. 2.

Referring now to the drawings in detail, FIGS. 1 and 2 illustrate a ram air parachute, generally designated by the reference numeral 10, in a partially deployed and a fully deployed condition, respectively. The parachute includes a canopy generally designated by the reference numeral 12, shown fully inflated in FIG. 2, from which a payload 15 is suspended by means of a plurality of suspension lines 16 connected at their upper ends to the bottom surface of the canopy at suspension line attachment points 56, as shown in FIG. 3. Groups of adjacent suspension lines 16 are anchored at their lower ends to the airborne guidance unit 20. A generally rectangular reefing slider device, generally designated by reference numeral 24, slides or descends from an upper operative reefing position, as shown in FIG. 1, to a lower position, as shown in FIG. 2.

The ram air canopy 12 has upper and lower flexible airfoil surfaces 26 and 28 which, together with chordwise extending ribs 32, form ram air inflated cells 30. The airfoil shaped surfaces 26 and 28 thus extend chordwise from an open leading edge portion 34 to a trailing edge portion 36 in the direction of forward glide. When the parachute 10 is deployed, the canopy 12 is normally inflated by inflow of air into the cells 30 between ribs 32 at the open leading edge portion 34, as is already well known in the art. Such inflation causes the canopy 12 to become fully extended in both the chordwise and spanwise directions, the former extending front to back and the latter extending from wing tip 35 to wing tip 35, to rapidly assume the shape shown in FIG. 2. However, in accordance with the present invention, inflation of the canopy 12 is delayed and modulated during initial descent of the parachute 10 by the reefing slider device 24.

Figure 4:
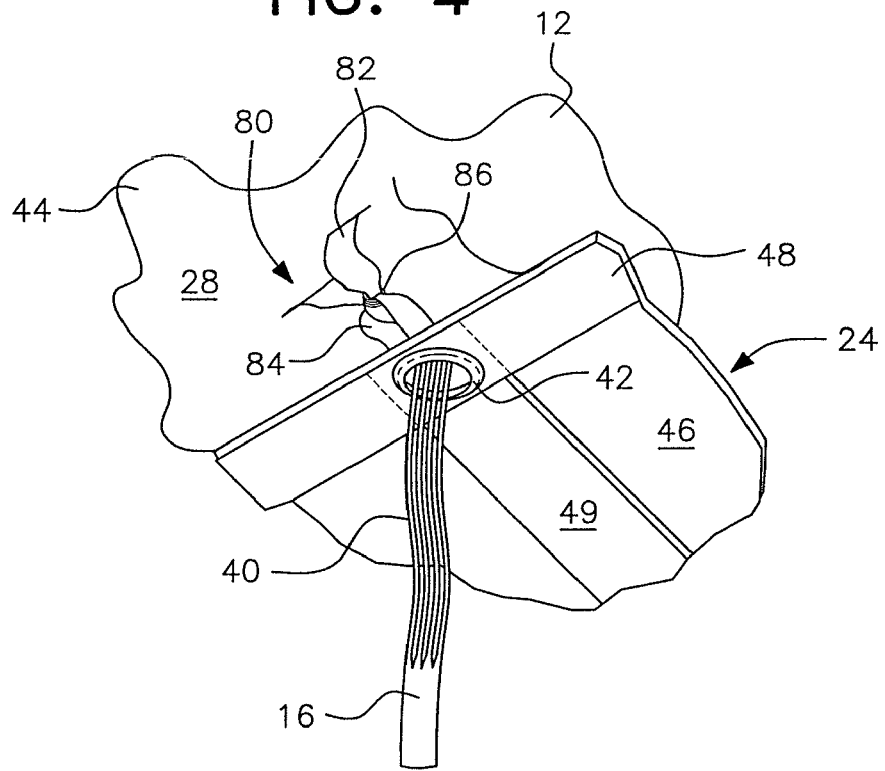
FIG. 4 is an enlarged view of detail "4" of FIG. 1.
Figure 5:
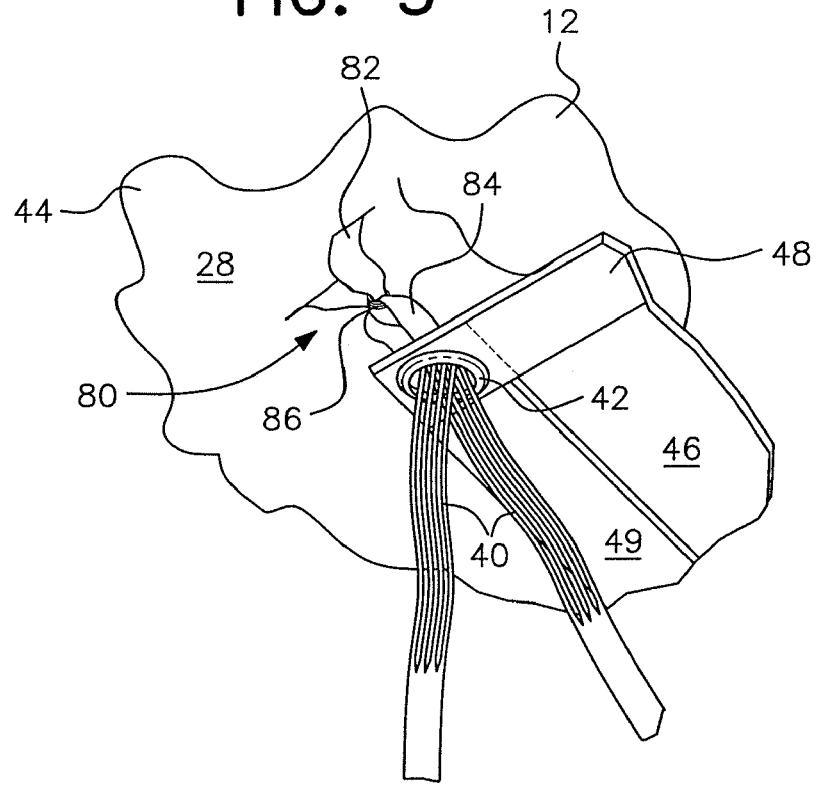
FIG. 5 is an enlarged view of detail "5" of FIG. 1.

The slider device 24 is initially retained against the bottom surface 28 of the canopy 12 by retaining devices generally designated by the reference numeral 80, as shown in FIGS. 4 and 5. As will be discussed more fully hereinafter, each retaining device 80 includes a canopy retaining loop 82 secured to the canopy, a slider retaining loop 84 secured to the slider 24, and a breakable fastening element 86 for securing the two loops together. When the fastening element 86 breaks, the slider is released from the canopy bottom surface 28 so that the slider 24 can descend, relative to the canopy, from its upper retained position as shown in FIG. 1 to its lower position as shown in FIG. 2.

As evident from FIG. 2, the airfoil gliding parachute 10 with which the retained slider 24 of the present invention is intended to operate can be very large, on the order of 3500 square feet with a wing span of about 100 feet. A chute of this size is designed to be able to operate effectively with a payload of up to 30,000 pounds and is greatly benefitted by the retained slider of the present invention which reduces the opening force on the payload by delaying the full opening of the chute.

Somewhat smaller ram air parachutes, but supporting payloads down to about 2,000 pounds, are also benefitted by the retained slider of the present invention. Further, even with the smaller design, ram air canopies 12 of this type having the size necessary to support loads of the foregoing magnitude, i.e., of from about 1,000 pounds to about 30,000 pounds, require a large number of suspension lines 16 to distribute the load. As best shown in FIG. 3, each suspension line 16 cascades from one lower main line rising from the risers into four upper cascaded lines 40 prior to spaced attachment of the upper cascaded lines 40 to the bottom surface 28 of the canopy 12 at the suspension line attachment points 56. This multiplication of lines creates a heightened risk, as compared with smaller and simpler chute designs, for crossing and tangling of the suspension lines 16 prior to and during deployment which can produce catastrophic results.

To address this line management problem, the slider of the present invention includes a plurality of individual grommets 42 through which the suspension lines pass in controlled groups. The number of upper cascaded lines to be passed through each grommet is adjustable according to design choice requirements. As shown in FIG. 4, according to a preferred embodiment, the two centermost forward edge grommets 42a each accommodate only the four upper cascaded lines from one of the two centermost suspension lines. Limiting the number of upper cascaded lines in the center grommets to four facilitates opening of the center cells, which provides stability to the canopy. Edge grommets closer to the wing tips, by contrast, typically accommodate eight upper cascaded lines each (rising from two lower main suspension lines), as shown in FIG. 5. By organizing and spacing the lines in this way, the slider assists in ensuring that the lines remain segregated and unobstructed, and that the canopy material 44 does not become twisted or bunched within a tangle of lines.

As shown particularly in FIG. 6, the slider 24 is constructed as a rectangular sheet 46 made of a relatively low porosity, flexible material. The sheet 46 is bounded on the edges by reinforcing strips or tapes 48. More specifically, the edges of the sheet 46 are bounded by a forward edge reinforcing tape 48a, a rear edge reinforcing tape 48b, and two wing tip edge reinforcing tapes 48c, 48d. These are preferably made of highly rip-resistant nylon fabric as well known in the parachute art.

Unlike prior art rectangular slider designs which typically included only four corner grommets, each of the edge reinforcing tapes 48a, 48b, 48c, 48d includes a plurality of intermediate edge slider grommets 42a, 42b, 42c, 42d which are interconnected in spaced relation to each other along the edge tapes 48a, 48b, 48c, 48d, and bounded by corner grommets 42e. According to the embodiment shown in FIG. 6, and including the corner grommets 42e in each of the following totals, the forward edge reinforcing tape 48a is provided with a total of ten grommets, the rear edge reinforcing tape 48b with a total of six grommets, and each wing tip edge reinforcing tape 48c, 48d with a total of four grommets.

Spaced between the forward edge reinforcing tape 48a and the rear edge reinforcing tape 48b, and generally parallel therewith, are two longitudinally extending inner reinforcing tapes 49a, 49b. Each of these tapes corresponds with the forward edge tape 48a in having a total of eight internal grommets 43a, 43b spaced equivalently therealong, with the outermost grommets on either end of such longitudinally extending inner tapes 49a, 49b being the intermediate grommets 42c, 42d on the wing tip edges 48c, 48d, for a total of ten grommets along each inner reinforcing tape 49a, 49b.

Similarly, spaced between the wing tip edge reinforcing tapes 48c, 48d and generally parallel therewith are eight laterally extending inner reinforcing tapes 49c, 49d, 49e, 49f, 49g, 49h, 49i, 49j. These tapes cross over the longitudinally extending inner tapes 49a, 49b at respective internal grommet locations 43a, 43b therealong and similarly join the forward and rear edges 48a, 48b at aligned grommet locations 42a, 42b.

The laterally extending inner reinforcing tapes 49c-49j are preferably not equidistantly spaced, but are preferably closer to one another nearest the wing tip edges 48c, 48d. This spacing generally corresponds with the narrowing of the cells nearest the wing tips of the ram air canopy as compared with the wider center cells. The center cell is widest to encourage its initial opening, while the wing tip cells are narrower to rigidify the wing and thereby prevent inadvertent collapse when incoming air is reduced during turning maneuvers.

The ratio of the span to the chord length of the slider 24 is generally the same as that of the wingspan to chord length of the corresponding canopy 12. In terms of absolute size, if the slider is too big it will not be efficient as the canopy will be allowed to spread too much at the outset, negating the effectiveness of the slider reefing function. Conversely, if the slider is too small, it will produce insufficient drag. For use with a ram air parachute canopy of the type shown in FIGS. 1 and 2, being on the order of 100 feet in wingspan with a chord length of about 30 feet, the slider is preferably about 20 feet spanwise and 7 feet chordwise. Hence, the ratio of the wingspan of the canopy to the span of the slider is about 5:1. With smaller parachutes of the same style construction, the ratio of the wingspan of the canopy to the span of the slider should remain substantially the same.

When the slider 24 is functioning with the parachute 10, the suspension lines 16 respectively extend slidably through the grommets 42, 43 to guide the slider upon its descent following the release of the fastening elements 86. The number of suspension lines 16 passing through each grommet 42, 43 depends upon the number of grommets, which can be used to effect the desired opening behavior of the canopy. For example, as the number of grommets is increased, the number of suspension lines and corresponding upper cascaded lines 40 per grommet is reduced while the force necessary to release the slider from the canopy is increased, assuming all of the grommets are retained.

As previously noted, the number of upper cascaded lines 40 per grommet 42, 43 depends upon the particular outcome desired. For example, if fewer total grommets are provided in the slider, the number of cascaded lines per grommet may be increased to twelve, or even more. However, this can make line management somewhat unwieldy and is ultimately limited by the size of the grommet. Conversely, if the total number of grommets is increased, then each grommet is required to retain fewer cascaded lines, such as only four cascaded lines per grommet throughout the slider. However, as the number of grommets is increased, the complexity of the slider is also increased, as is the time required to pack the parachute in preparation for air drop, as will be discussed more fully hereinafter.

Figure 7:
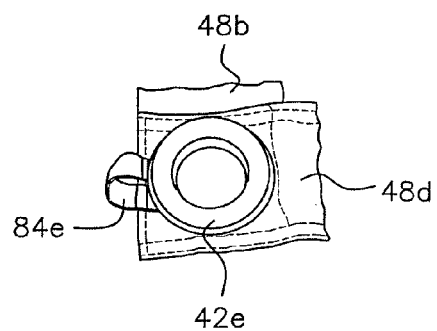
FIG. 7 is an enlarged view of detail "7" in FIG. 6, showing a corner grommet with adjacent slider retaining loop.

As shown particularly by the corner grommet 42e of FIG. 7, each grommet of the slider that is to be secured to the canopy has a corresponding slider retaining loop 84, or 84e in FIG. 7. If not all grommets are to be retained, then the unretained grommets do not have to have an associated retaining loop. As used herein, "retaining" a grommet means securing the slider retaining loop adjacent such grommet to a corresponding canopy retaining loop on the canopy; similarly, the slider is "retained" in that it is secured to the canopy.

The slider retaining loops 84 are preferably made of reinforced nylon, although any lightweight, high-strength material could be used. The loops 84 are sewn or otherwise secured to the reinforcing tapes 48, 49, or 48b and 48d in FIG. 7.

Whether or not all of the grommets are to be retained will depend upon design requirements. Any number of grommets may be retained. For example, every grommet can be retained, or only those grommets on the edges of the slider, or alternate grommets, or any other combination of grommets. According to a preferred embodiment, the grommets 42 located at the periphery or edges of the slider are retained while the center or internal grommets 43, which are used to segregate and organize the corresponding suspension lines stemming from the center areas of the canopy, are not necessarily retained and, if not, do not have associated retaining loops.

Figure 9:
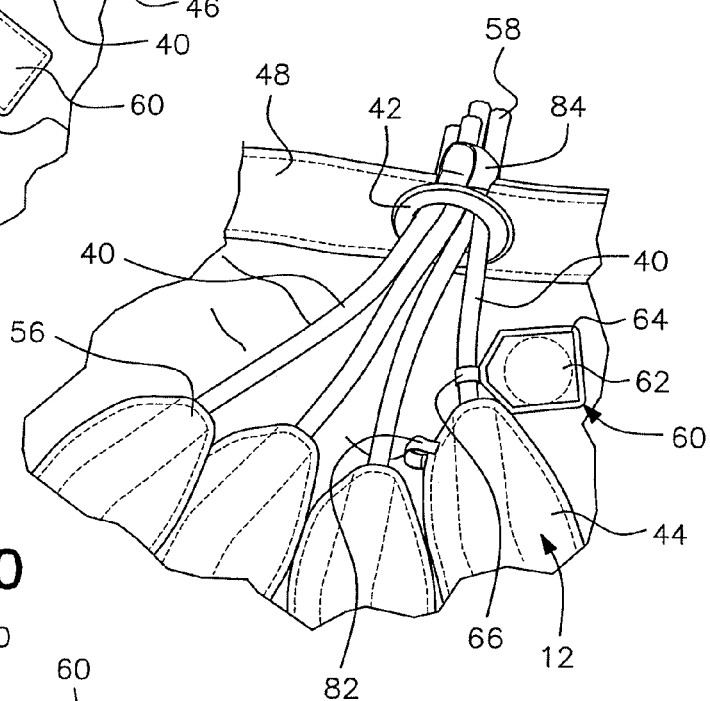
FIG. 9 shows four upper cascaded lines from a suspension line gathered through a slider grommet during packing, with the shortest cascaded line provided with a detachable slider stop and the corresponding canopy portion fitted with a canopy retaining loop.

The suspension line attachment points 56 where the upper cascaded lines 40 are secured to the canopy typically are placed along the chord ribs as can be seen in FIG. 3. At each suspension line attachment point 56, the cascaded line is secured to the canopy in accordance with conventional line attachment techniques. When the canopy is being packed, or prepared for air drop, the four upper cascaded lines of each suspension line are gathered together to be run through an appropriate grommet. When the lines are gathered and passed through the grommet, they will have slightly different lengths according to their individual attachment points on the canopy, as depicted in FIG. 9. To prevent the canopy fabric 44 from being drawn through the grommet 42 with the lines, the shortest line 58 within each grommet group of lines is provided with a slider stop 60. The canopy retaining loops 82 are also placed adjacent the shortest suspension lines as shown.

The slider stop 60 is an element that is sized so as to be unable to fit through the grommets and is preferably made of reinforced nylon although other lightweight materials could also be used. The material itself, or the material in combination with a contained object or other material, must be sufficiently rigid to prevent folding or crushing thereof that would allow the slider stop to be pulled through the grommet.

Figure 8:
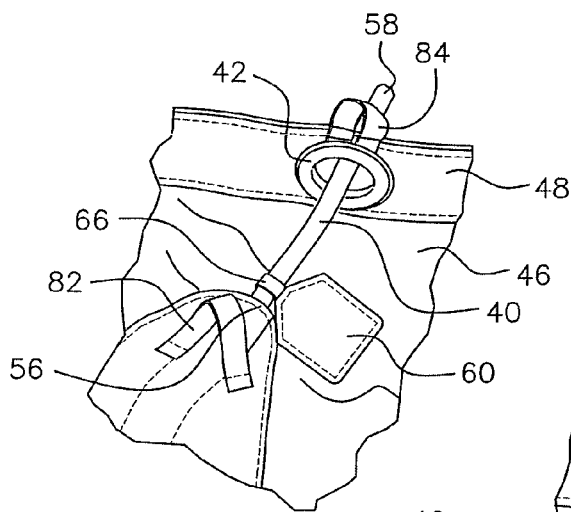
FIG. 8 depicts a suspension line extending from its attachment point on the canopy through a slider grommet during packing in accordance with the present invention.

As shown in FIGS. 8 and 9, the slider stop 60 is preferably a separate component that can be tied to the desired line and then, if necessary, untied and retied to a different line. This allows adjustments to be made to the canopy while in the field, as no sewing is required to secure the slider stop and no damage occurs to the chute upon removal of the slider stop. In the embodiment shown in FIG. 9, the slider stop is constructed with a hard object, such as a rigid disc 62, encased within a nylon sleeve 64. An attachment loop 66, used to secure the slider stop 60 to the cascaded suspension line 40, is sewn to the nylon sleeve 64. Any sufficiently rigid and lightweight object could be encased within the nylon sleeve 64 to provide the slider stop function.

Figure 10:
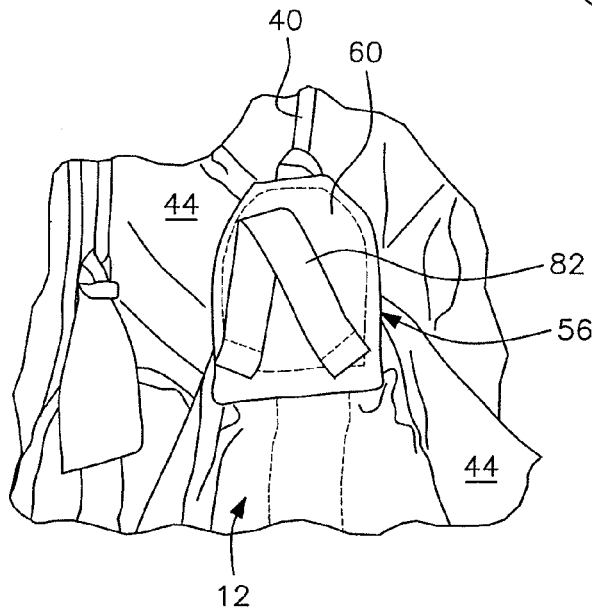
FIG. 10 depicts an alternative arrangement in accordance with the present invention in which the slider stop is secured to the canopy and the canopy retaining loop is attached directly to the slider stop.

In an alternative embodiment, the slider stop 60 may be sewn into the fabric 44 of the canopy 12 at the suspension line attachment point 56, as shown in FIG. 10. With this configuration, the canopy retaining loop 82 can be advantageously secured to the slider stop itself as shown. As with the embodiment of FIGS. 8 and 9, the slider retaining loop 84 adjacent the grommet 42 and the canopy retaining loop 82 on the shortest associated suspension line 58 are then secured together by the fastening element 86 as shown in FIGS. 4 and 5. As with the slider retaining loops, the canopy retaining loops 82 are preferably made of reinforced nylon or other lightweight, high-strength material.

As already discussed, the number of grommets provided on any given slider will depend on the canopy size and construction, as well as the degree of canopy opening restriction that is desired. However, for the purposes of explanation, the particular slider embodiment of FIG. 6, in conjunction with a parachute of the type shown in FIGS. 1 and 2, will be described in the following explanation of the process for packing a parachute with a retained slider according to the present invention.

Returning to the specific construction of the slider 24 illustrated in FIG. 6, according to the preferred embodiment shown, the grommets 42 along the periphery of the slider are retained. Therefore, counting so as to include the corner grommets 42e in each total, there are ten leading edge grommets 42a, eight wing tip grommets 42c, 42d, and six rear edge grommets 42b which must be secured to the canopy. This equates to an absolute total of twenty grommets to be retained.

In preparation for securing the slider 24 to the canopy 12, the canopy must be equipped with sufficient canopy retaining loops 82 to correspond with the slider retaining loops 84 on the slider 24. Hence, ten canopy retaining loops 82 are attached to the leading edge 34 of the canopy, four to each wing tip 35, and six to the trailing edge 36 of the canopy 12. As with the slider, the corner retaining loops on the leading edge 34 of the canopy are the same as the forward-most corner retaining loops of the canopy wing tips 35. Similarly, the corner retaining loops on the canopy trailing edge 36 of the canopy are the same as the rear corner retaining loops of the wing tips 35. Accordingly, the total number of retaining loops 82 on the canopy is twenty.

The process by which the slider is retained against the canopy is undertaken as follows. First, the ten forward edge slider retaining loops 84a, 84e are secured to the ten leading edge canopy retaining loops 82; the retaining loops on the corners are designated 84e for clarity given their shared membership with the group of wing tip retaining loops 84c, 84d.

Starting from either the left or the right slider wing tip with loop 84e and working toward the center, corresponding pairs of slider and canopy retaining loops 84a, 82 are brought into alignment with one another. Upon reaching the center, the aligning process is repeated beginning from the opposite wing tip corner loop 84e. Once all of the retaining loop pairs of slider loops 84a, 84e and canopy loops 82 are aligned, the loops of each pair are secured to one another using appropriate fastening elements 86.

The fastening elements can include string, cord, cable-tie type fasteners, etc. Any fastening element 86 having a set or calibrated break strength within a required range and a configuration making it suitable to join two loops of fabric may be used. According to a preferred embodiment as shown in FIGS. 11A, 11B, 11C, 12 and 13, the fastening element 86 is embodied as a calibrated break tie or cord 78 such that each aligned pair of retaining loops is fastened together by tying.

Figures 11A, 11B, 11C:
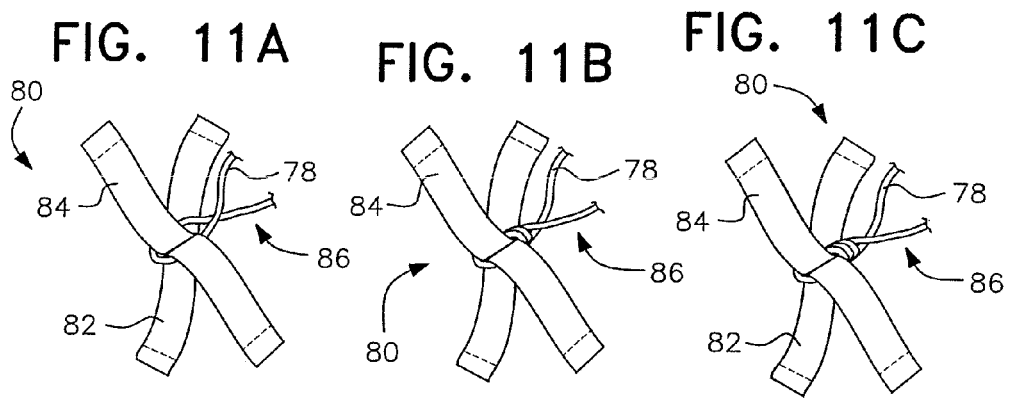
FIG. 11A shows a calibrated break cord with one turn around an aligned pair of slider and canopy retaining loops in accordance with the present invention.
FIG. 11B shows the calibrated break cord of FIG. 11A with two turns around the aligned pair of retaining loops.
FIG. 11C shows the calibrated break cord of FIGS. 11A and 11B with three turns around the aligned pair of retaining loops.
Figure 12:
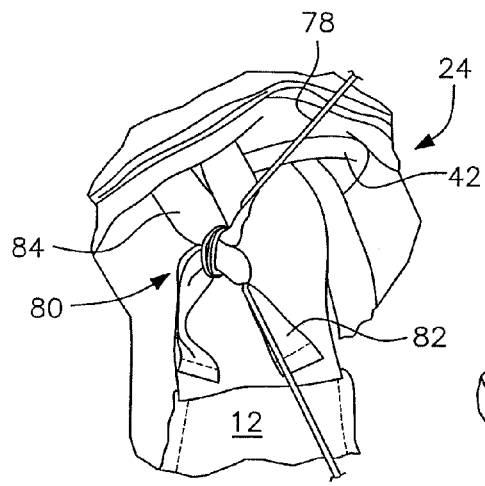
FIG. 12 illustrates the securing of the retaining loops on the slider and canopy with multiple turns of a calibrated break tie in accordance with the present invention.
Figure 13:
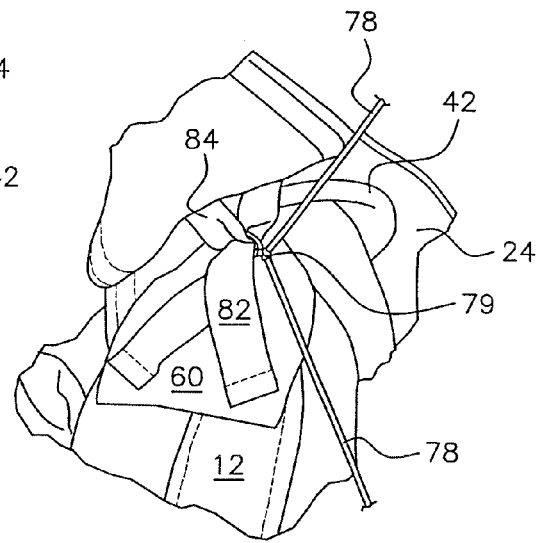
FIG. 13 illustrates knotting of the calibrated break tie or cord of FIG. 12.

To tie each aligned pair of loops, the calibrated break tie or cord 78 is passed through each of the two retaining loops 82, 84 at least once, i.e., for one turn, as shown in FIG. 11A, and then tied. For increased tie strength, the cord 78 is passed through the two retaining loops 82, 84 a second time, i.e., for two turns, as shown in FIG. 11B, and then tied. Similarly, the cord 78 may be passed through the two retaining loops 82, 84 a third time, i.e., for three turns, as shown in FIG. 11C; this process may be continued with as many turns as desired. The turns are pulled tightly, as shown in FIG. 12, and then a knot 79 is formed with the cord ends to complete the tie, as shown in FIG. 13. When fastened in this manner, the slider 24 is retained against the canopy 12 as in FIG. 1.

Using calibrated break ties or cord, it has been determined that desirable chute opening performance is achieved with an incremental pattern of tie strength beginning from the wing tips 35 and edge tapes 48c and 48d and increasing toward the center. More particularly, and still referring to the forward edge 48a of the slider, the process of tying the aligned loops begins from either the left or the right slider wing tip 48c, 48d and working toward the center. First, the wing tip corner loops are secured together using one turn of the cord. The next pair of loops is secured using two turns of cord, the next pair using three turns of cord, and the next pair using four turns of cord. Finally, the centermost pair of loops is secured using four turns of cord. Upon completing this centermost pair of loops, the process is repeated beginning from the opposite wing tip.

Once the ten pairs of retaining loops 82, 84 on the forward and leading edges 48a, 34 of the slider and canopy, respectively, have been retained in the manner just described, the eight wing tip retaining loops on the slider, which include four intermediary loops 84c, 84d and four corner loops 84e, are secured to the corresponding eight wing tip retaining loops on the canopy (not shown). Since the loops 84e on the forward corners of the wing tips 48c, 48d have already been secured as part of the securing of the retaining loop pairs on the forward/leading edges of the slider/canopy, there remain only six pairs of wing tip retaining loops 84c, 84d, 84e to be secured, three on each side.

Beginning on either side and working front to rear, the wing tip retaining loops 84c, 84d, 84e on the slider are aligned with the corresponding wing tip retaining loops on the canopy. Once aligned, each pair is secured by one turn of the calibrated break cord, as shown in FIG. 11A, and knotted, as shown in FIG. 13. The process is repeated on the opposite wing tip.

The remaining six rear edge slider retaining loops and trailing edge canopy retaining loops are then similarly secured using the same tying technique. Beginning on either side and working from the wing tip corner loops 84e on the rear corner toward the center, the respective pairs of loops are aligned with one another. Since the wing tip corner loops 84e by the rear corner grommets 42e have already been secured as part of the securing of the retaining loop pairs on the wing tip edges 48c, 48d of the slider/canopy, there remain only four pairs of rear edge retaining loops 84b to be secured. The next inward pair is secured by two turns of the calibrated break cord, as shown in FIG. 11B, and knotted, as shown in FIG. 13. Finally, the innermost pair is secured by three turns of the cord, as shown in FIG. 11C, and knotted. The process is repeated on the opposite side working from the opposite wing tip inward.

To help prevent the possibility of a "line over", a situation in which the suspension lines attached to the trailing edge of the canopy get crossed over to the leading edge prior to deployment, often with serious results upon deployment, the process of retaining the slider may conclude with the final step of gathering the rear edge slider stops together and securing them in a bundle with a single turn of calibrated tie cord. The cord is passed through each of the trailing edge retaining loops, which are located adjacent the slider stops, with the ends of the cord then being drawn snugly together, but without drawing up the canopy material, and then knotted as with the other ties.

As is evident from the example just given, the higher stress to which the center of the canopy is subjected necessitates that the fastening elements retaining the centermost edge grommets be stronger than those used to retain the wing tip grommets. The goal in defining the different strengths of the fastening elements is to have all of the fastening elements break simultaneously in response to air flow forces encountered during parachute descent. Simultaneous breaking of the fastening elements releases the canopy evenly so that its pressurization is regular across the span. The rear edge also needs to break evenly with the front edge and thus is secured with weaker tie strength reflective of the lower level of stress imposed on the rear edge relative to that on the front.

A range of other fastening materials may be used to retain the slider as has already been stated. The calibrated break cord used in the representative example is preferably one that is readily available to military users from existing supply stocks such as, for example, MIL-T-5660-Style A Ticket 5. Use of such a standard supply stock material, with varying strength obtained through variation in the number of turns, allows a single material supply source to be used to secure all of the retaining loops, increasing the efficiency of military operations by simplifying the equipment requirements and avoiding complexity in the packing procedure. However, any connecting element or combination of connecting elements may be used. For example, cable ties of different strengths may be secured to different retaining loop pairs, i.e., with stronger cable ties in the center and weaker cable ties on the wing tips. Alternatively, cords of different strengths could be used for specific retaining loop pairs.

Other fastening mechanisms of various types that will release when subjected to a specified amount of force may also be used while retaining the advantages already described in connection with the break ties. For example, magnets, snaps, calibrated wires, clips, etc. could all be effectively adapted to retain the slider until sufficient force is applied thereto in accordance with the present invention.

Figure 15:
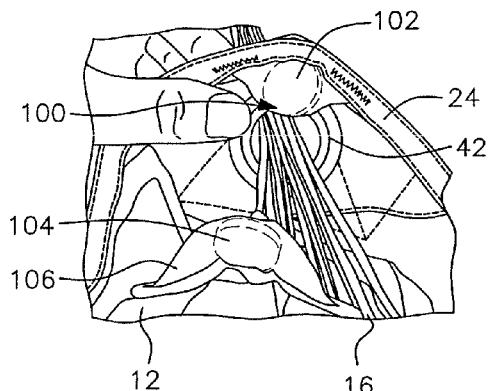
FIG. 15 shows a first alternative fastening mechanism embodiment using magnetic elements in accordance with the present invention.
Figure 16:
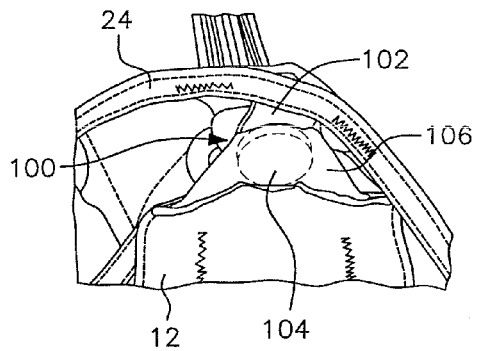
FIG. 16 shows the magnetic elements of FIG. 15 in a fastened configuration.

A first alternative embodiment using magnetic retaining devices is set forth in FIGS. 15 and 16. As shown in FIG. 15, a magnet 100 is positioned within a fabric housing 102 that is sewn onto or otherwise secured to the slider 24; preferably, the fabric housing is adjacent a slider grommet 42. A mating magnet 104 is secured within a similar fabric housing 106 that is sewn or otherwise connected to the canopy 12 at the point where the slider stop 60 comes in contact with the slider grommet 42. The fabric housings protect and secure the magnets against the respective slider or canopy portion to which they are attached.

During the packing process, the two magnets 100, 104 are coupled to one another as shown in FIG. 16 and thereby hold the slider 24 against the canopy 12. When the canopy deploys, the slider is retained against the bottom of the canopy by the magnetic force until enough pressure builds up inside the canopy to pull the two magnets 100, 104 apart. Once the magnets are separated, the slider is free to move down the suspension lines 16.

Figure 17:
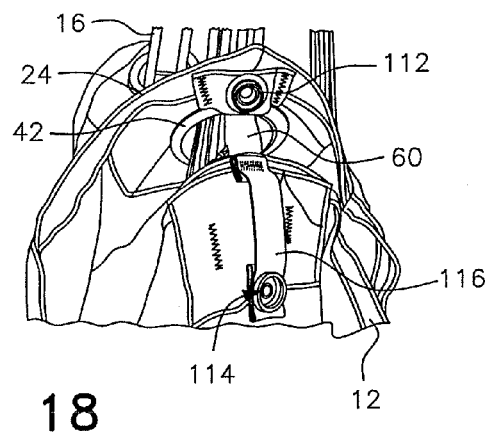
FIG. 17 shows a second alternative fastening mechanism embodiment using a snap fastener in accordance with the present invention.
Figure 18:
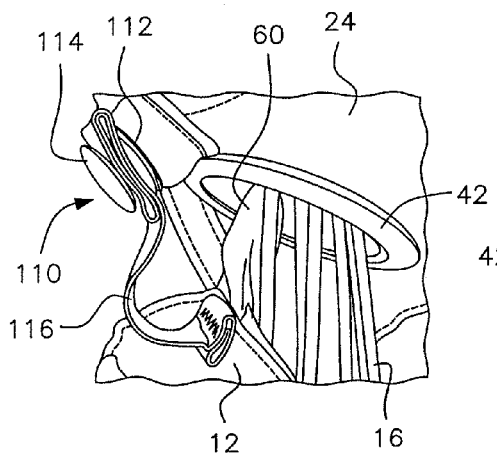
FIG. 18 shows the snap fastener elements of FIG. 17 in a fastened configuration.
Figure 19:
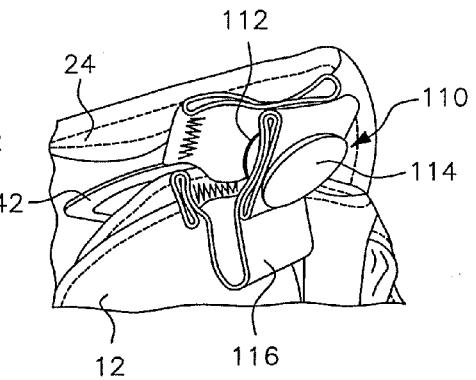
FIG. 19 is another view of the snap fastener elements of FIG. 16 in a fastened configuration.

A second alternative embodiment using snap fasteners 110 as retaining devices is set forth in FIGS. 17, 18 and 19. As shown in FIG. 17, each snap fastener 110 includes a stud 112 and a mating socket 114. The stud 112 is preferably positioned on the slider 24 adjacent to a grommet 42, while the socket 114 is installed on a piece of webbing 116 that is sewn or otherwise connected to the canopy 12 at the point where the slider stop 60 comes in contact with the slider grommet 42. As would be understood by persons of ordinary skill in the art, the positions of the stud 112 and socket 114 could be reversed, and a material other than webbing could be used to hold the socket 114.

During the packing process, the stud 112 and socket 114 are snapped together to hold the slider 24 against the canopy 12, as shown in FIGS. 18 and 19. When the canopy deploys, the slider is retained against the bottom of the canopy by the mechanical connection of the snap fastener elements 112, 114 until enough pressure builds up inside the canopy to pull the socket 114 from the stud 112 and unfasten the snap. Once the socket and stud have been pulled apart, the slider is free to move down the suspension lines.

Clips having a determined strength may also be used to secure a portion of the canopy to the slider, preferably adjacent a grommet location. The clips may be attached with a string tie or other mechanism to either the slider or the canopy so that, once they have been forced to release the fabric they were holding, the clips will be retained and can be reused. However, clips represent a less preferred embodiment as the clip structure tends to be bulky and can become caught on other portions of the canopy or slider during the packing process.

In addition to the use of different fastening mechanisms, tie materials and related methods, the relative strength of the ties or other fastening mechanisms used to secure the center retaining loop pairs as opposed to the wing tip pairs may also be varied to suit the particular size parachute and payload. For example, as the weight of the payload is reduced within a moderate range, the fastening elements will take slightly longer to release, whether by breaking as in the case of ties or calibrated wires, or by element separation as in the case of magnets or snaps, but the delay will not be unduly extended. When the weight of the payload is substantially reduced, as from 10,000 pounds to 5,000 pounds, however, a different fastening element arrangement may be necessary to ensure timely fastening element release.

In addition to varying the strengths of a particular fastening mechanism to accommodate the varying loads placed upon different areas of the canopy during deployment, more than one type of fastening mechanism may be utilized on the same canopy. For example, in certain parachute payload conditions, break ties may be used in the center of the canopy where the force is greatest, while magnets are used on the wing tips where a reduced force is experienced. This is advantageous in that the ease of the magnetic closure is obtained in those areas of the canopy where the retaining power of smaller magnets is sufficient, while avoiding the use of large heavier magnets as would otherwise be needed to accommodate the greater center loading were only magnetic fastening mechanisms to be used.

Any of the fastening mechanisms discussed herein, as well as other comparable fastening mechanisms that are structured to release when subjected to a level of force as described herein, may be used together in various combinations on a single canopy to best suit the particular load and force requirements thereof. In accommodating these combinations, the canopy may be equipped with both a magnetic and a retaining loop device at a particular grommet, or with both a snap fastener and retaining loops at a particular grommet. In this way, the magnetic connection (or the snap fastener) can be used when their retaining force is sufficient, as with a smaller payload, reducing the time needed for packing of the parachute. The same canopy configuration can thereafter be used with a heavier payload by securing the retaining loop device, which is at the same grommet formerly secured by the magnets or snap fastener, with appropriate break ties. This use of alternate fastening mechanisms provides significant versatility and variability in load capability using a single canopy.

The speed at which the chute is to be deployed must also be taken into consideration when planning fastening element strength. Stronger fastening elements are needed to withstand the greater opening forces experienced at higher altitudes where higher air drop speeds are required to sustain lift. Weaker fastening elements may be advisable at lower altitudes to ensure adequate flight time for the parachute.

Figure 14:
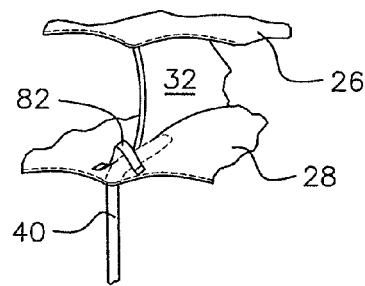
FIG. 14 is an enlarged view of detail "14" of FIG. 2.

The retained slider according to the present invention requires only conventional materials, making it cost-effective and relatively simple to employ. Upon chute deployment, the fastening elements break or are separated when sufficient force is created by the inflow of air into the cells of the canopy, allowing the slider 24 to descend to the position shown in FIG. 2. However, in the case of the break ties, the canopy retaining loops 82 remain secured to the canopy 12, as shown in FIG. 14, just as the slider retaining loops 84 are still affixed to the slider 24, thus enabling both loops to be reused with only a new fastening element being required. In the case of magnets or snaps, or course, the fastening mechanism elements remain respectively secured to one of the canopy and slider and can be reused almost indefinitely; all that is required is to refasten the mating components during the packing process.

The slider retention design according to the present invention also facilitates chute preparation. As compared with prior art designs for the controlled opening of large canopies which could take multiple persons several days or more to pack preparatory to air drop, the retained slider system of the present invention can be folded and packed by two people in about four hours using conventional parachute packing techniques.

In sum, the retained slider according to the present invention provides not only for greater regularity in the expansion of the chute through delay in the opening thereof, the duration of which is directly responsive to actual forces on the chute, but also provides improved line management capability through segregation and retention of groups of lines within the plurality of individual grommets for greater organization and increased deployment safety.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. In combination with a ram air parachute canopy having a wingspan with upper and lower airfoil surfaces separated by chordwise-extending ribs to form cells inflated by inflow of air at an open leading edge, and suspension lines connecting the lower surface of the canopy to a load, the improvement comprising:

a reefing slider with a spanwise length and a chordwise width having reinforced openings through which the suspension lines extend, said slider further having a plurality of separate retaining devices spaced along said spanwise length and secured to said canopy for retarding descent of the slider relative to the canopy from an upper reefing position in which inflation of the canopy is restricted, said slider being releasable from said canopy to descend along said suspension lines in response to release of said retaining devices due to force created by said inflow of air to said cells, a number of said retaining devices at a central area along said slider spanwise length and secured to a central part of said canopy wingspan being stronger than a number of said retaining devices at outer edges of said slider spanwise length and secured to wing tip portions of said canopy.

2. The combination as set forth in claim 1, wherein each of said retaining devices includes a slider retaining element secured to said slider, and a canopy retaining element secured to said canopy, said slider retaining elements and said canopy retaining elements being releasably secured to one another and calibrated so that the force needed to separate the slider retaining elements from the canopy retaining elements is greater at said central part of said canopy wingspan than at said canopy wing tips.

3. The combination as set forth in claim 2, wherein said slider retaining elements and said canopy retaining elements are mating magnetic elements.

4. The combination as set forth in claim 2, wherein said slider retaining elements and said canopy retaining elements are mating snap fastener elements.

5. The combination as set forth in claim 2, wherein each slider retaining element is secured to said slider adjacent a reinforced opening and said canopy retaining elements are secured to said canopy in spaced relationship corresponding to a spacing of said slider retaining elements so that said slider retaining elements and said canopy retaining elements are releasably secured to one another in corresponding pairs.

6. The combination as set forth in claim 5, wherein said corresponding pairs of slider retaining elements and said canopy retaining elements are releasably secured to one another tie elements.

7. The combination as set forth in claim 6, wherein said tie elements are cable-tie type fasteners.

8. The combination as set forth in claim 6, wherein said tie elements include cord or string.

9. The combination as set forth in claim 8, wherein each of said slider retaining elements includes a slider retaining loop and each canopy retaining element includes a canopy retaining loop, a tie element being passed through the paired loops on said slider and canopy and tied to join each corresponding pair.

10. The combination as set forth in claim 9, wherein a tie strength of said tie elements incrementally increases from loop pairs adjacent said wing tips to loop pairs at the center area of the canopy.

11. The combination as set forth in claim 9, wherein said tie element is passed through the loops of a corresponding pair of retaining elements more than once before being tied.

12. The combination as set forth in claim 11, wherein tie elements of corresponding pairs at the central part of the canopy are passed through their associated loops a greater number of times than are tie elements of corresponding pairs at said wing tips so that a tie strength at the central part of the canopy is greater than a tie strength at the wing tips.

13. The combination as set forth in claim 12, wherein a tie strength of tie elements connecting loops of corresponding pairs along the canopy wingspan between the central part and the wing tips is intermediate between said central part tie strength and said wing tip tie strength, said intermediate strength being determined by a number of times the tie elements pass through their associated pairs of loops before being tied.

14. A ram air parachute comprising:
a canopy having a wingspan and upper and lower airfoil surfaces separated by chordwise-extending ribs to form cells inflated by inflow of air at an open leading edge;
suspension lines connecting the lower surface of the canopy to a load; and
a reefing slider with a spanwise length and a chordwise width having reinforced openings through which the suspension lines extend, said slider further having a plurality of separate retaining devices spaced along said spanwise length and secured to said canopy for retarding descent of the slider relative to the canopy from an upper reefing position in which inflation of the canopy is restricted, said slider being releasable from said canopy to descend along said suspension lines in response to release of said retaining devices due to force created by said inflow of air to said cells, a number of said retaining devices at a center along said slider spanwise length and secured to a central part of said canopy wingspan being stronger than a number of said retaining devices at outer edges of said slider spanwise length and secured to wing tip portions of said canopy.

15. The ram air parachute as set forth in claim 14, wherein each of said retaining devices includes a slider retaining element secured to said slider and a canopy retaining element secured to said canopy, said slider retaining elements and said canopy retaining elements being aligned in corresponding pairs and calibrated so that the force needed to separate the slider retaining elements from the canopy retaining elements is greater at said central part of said canopy wingspan than at said canopy wing tips.

16. The ram air parachute as set forth in claim 15, wherein said slider retaining elements and said canopy retaining elements are mating magnetic elements.

17. The ram air parachute as set forth in claim 15, wherein said slider retaining elements and said canopy retaining elements are mating snap fastener elements.

18. The ram air parachute as set forth in claim 15, wherein said corresponding pairs of slider retaining elements and said canopy retaining elements are releasably secured to one another by tie elements including cable-tie type fasteners, cord or string.

19. The ram air parachute as set forth in claim 18, wherein each of said slider retaining elements includes a slider retaining loop and each canopy retaining element includes a canopy retaining loop, a tie element being passed through the pair loops on said slider and canopy at least once and tied to join each corresponding pair.

20. The ram air parachute as set forth in claim 19, wherein said tie elements are cords, the tie element cords of corresponding pairs at the central part of the canopy being passed through their associated loops a greater number of times than are tie element cords of corresponding pairs at said wing tips so that a tie strength at the central part of the canopy is greater than a tie strength at the wing tips.

21. A method of securing a reefing slider to a ram air parachute canopy having a wingspan and upper and lower airfoil surfaces separated by chordwise-extending ribs to form cells inflated by inflow of air at an open leading edge, and suspension lines connecting the lower surface of the canopy to a load, said reefing slider having a plurality of reinforced openings spaced from one another through which the suspension lines extend, said slider further having slider retaining elements adjacent at least some of said reinforced openings and said canopy having canopy retaining elements in spaced relationship corresponding to a spacing of said slider retaining elements, the method comprising the steps of:
aligning the canopy retaining elements with said slider retaining elements to form a plurality of retaining element pairs; and
releasably securing the slider retaining elements and the canopy retaining elements of each respective retaining element pair to one another along the wingspan of said canopy, said step of securing including securing retaining element pairs near a central area of said canopy with a mechanical connection having a first connection strength and securing retaining element pairs near the wing tips of the canopy with a mechanical connection having a second connection strength, said first connection strength being greater than said second connection strength, said releasably secured pairs of retaining elements securing said slider to said canopy to retard descent of the slider relative to the canopy from an upper reefing position in which inflation of the canopy is restricted, said slider being released from said canopy to descend along said suspension lines to a lowered position in response to release of said retaining elements from one another due to force created by said inflow of air to said cells.

22. The method as set forth in claim 21, wherein each of said slider retaining elements includes a slider retaining loop and each canopy retaining element includes a canopy retaining loop, said step of releasably securing including passing a tie element through the canopy retaining loop and the slider retaining loop of each retaining element pair and tying the tie element, tie elements that secure retaining element pairs near a central area of said canopy being passed through the respective loop pairs more than once before tying to obtain said first connection strength, and tie elements that secure retaining element pairs near the wing tips of said canopy being passed through the respective loop pairs a fewer number of times before tying as compared with said central area pairs to obtain said second connection strength.

* * * * *